United States Patent
Wiedenhoft et al.

(10) Patent No.: US 6,739,316 B2
(45) Date of Patent: May 25, 2004

(54) METHOD FOR THE DAMPING OF LOAD IMPACTS IN THE DRIVE TRAIN OF A MOTOR VEHICLE DRIVEN BY AN INTERNAL COMBUSTION ENGINE EQUIPPED WITH AN ELECTRONIC CONTROL SYSTEM

(75) Inventors: Dieter Wiedenhoft, Waldfischbach-Burgalben (DE); Stefan Horst, Frankfurt (DE)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/954,981

(22) Filed: Sep. 18, 2001

(65) Prior Publication Data

US 2002/0043244 A1 Apr. 18, 2002

(30) Foreign Application Priority Data

Sep. 22, 2000 (DE) .......................... 100 47 076

(51) Int. Cl.$^7$ ................................. F02P 5/00
(52) U.S. Cl. .............................. 123/406.23; 123/192.1; 701/70
(58) Field of Search ..................... 123/406.23, 491, 123/399, 478, 406.21; 701/70

(56) References Cited

U.S. PATENT DOCUMENTS

| | | | | | |
|---|---|---|---|---|---|
| 5,448,976 | A | * | 9/1995 | Treinies et al. | 123/419 |
| 5,623,906 | A | * | 4/1997 | Storhok | 123/419 |
| 5,979,404 | A | * | 11/1999 | Minowa et al. | 123/399 |
| 6,038,505 | A | * | 3/2000 | Probst et al. | 701/65 |

FOREIGN PATENT DOCUMENTS

| | | |
|---|---|---|
| DE | 19534633 A1 | 12/1996 |
| DE | 19712843 A1 | 10/1998 |
| DE | 19753996 A1 | 6/1999 |
| DE | 19753997 C1 | 7/1999 |
| DE | 19838454 C1 | 3/2000 |
| DE | 19905604 A1 | 8/2000 |

* cited by examiner

*Primary Examiner*—Hieu T. Vo
*Assistant Examiner*—Johnny H. Hoang
(74) *Attorney, Agent, or Firm*—Christopher DeVries

(57) ABSTRACT

The invention concerns a method for the damping of load impacts in the drive train of a motor vehicle driven by an internal combustion engine equipped with an electronic control system. It is the aim of the invention to provide load impact damping which adapts to the varying vibration behavior of the drive train during the life of a motor vehicle.

9 Claims, 1 Drawing Sheet

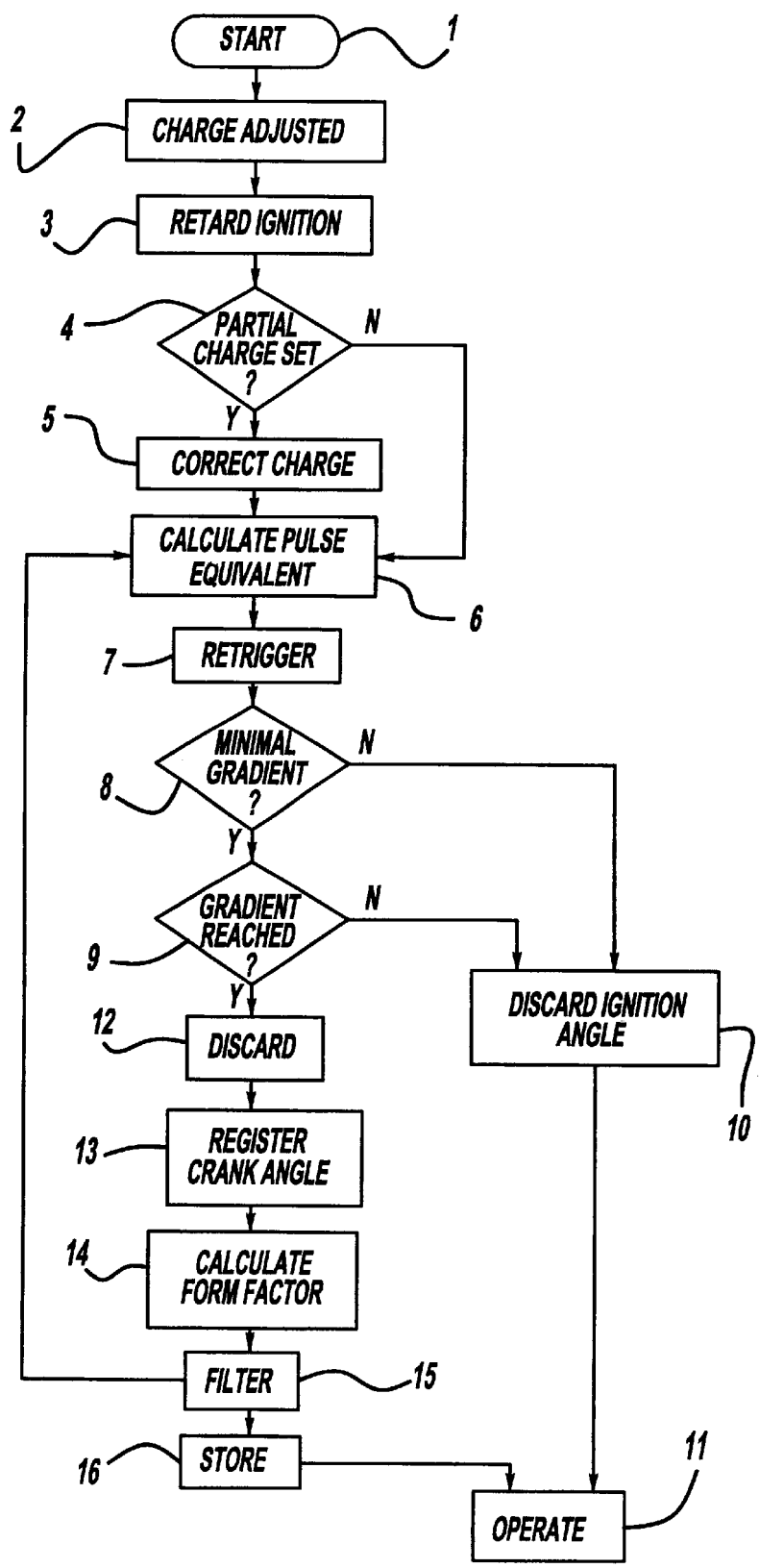

METHOD FOR THE DAMPING OF LOAD IMPACTS IN THE DRIVE TRAIN OF A MOTOR VEHICLE DRIVEN BY AN INTERNAL COMBUSTION ENGINE EQUIPPED WITH AN ELECTRONIC CONTROL SYSTEM

TECHNICAL FIELD

The invention concerns a method for damping the load impacts in the drive train of a motor vehicle powered by an internal combustion engine and equipped with electronic controls.

BACKGROUND OF THE INVENTION

The drive train of a vehicle beginning with the engine up to the wheel tread of the drive wheels represents a transmission system which can be excited into more or less damped vibrations in the presence of disturbing factors. In motor vehicles powered by internal combustion engines, a fuel mixture jump occurs in the fuel feed, e.g., in the case of an acceleration process introduced by the driver via the accelerator pedal causing a jump in the load variation represents one such excitation. The load impact resulting due to the jump in the load variation represents a loss of comfort in addition to the excitation of vibration and should therefore be substantially suppressed.

SUMMARY OF THE INVENTION

DE 197 53 997 C1 describes a method whereby vibrations can be avoided by influencing the quantity of fuel supplied to the internal combustion engine, thus compensating for the vibrations by adjusting the fuel supply by means of a transmission member. For this purpose, it is proposed that the transmission function of the transmission member be represented as the inverse function to the transmission function of the entire drive train including the fuel metering system (transmission system) and as a fractional rational function in the frequency representation, where the numerator of the fractional rational function is equal to the denominator of the transmission function of the transmission system.

Through the choice of a time constant and a damping magnitude in the numerator of the inverse transmission function, i.e., upon calculation of the present fuel metering, damping of the vibrations is achieved.

Through the choice of an additional time constant and an additional damping magnitude in the denominator of the inverse transmission function, a load impact damping is also accomplished.

The disadvantage is that due to the fixed time constant, the load impact damping is not permanent since, over the service life of a motor vehicle, the vibration behavior of the drive train is subject to relatively great variations.

The objective of the invention is to devise a method for damping the load impacts in the drive train of a motor vehicle driven by an internal combustion engine equipped with an electronic control whereby said cushioning is preserved almost without change over the entire service life of the vehicle, while the number of parameters to be allowed for should remain small in order to simplify the application costs.

According to the invention, this problem is solved by the features of the claim.

With this method one succeeds in avoiding load impacts in the drive train of a motor vehicle in the case of a varying load and in the case of a tip-in, i.e., in the case of a sudden change in the position of the accelerator pedal by the driver. The vehicle can be driven smoothly and free of shaking. The method is characterized by the fact that the load impact damping responds rapidly, that it adapts itself during the entire service life of the vehicle to the varying conditions of the drive train and can be applied at low cost to the electronic control system of an internal combustion engine.

BRIEF DESCRIPTION OF THE DRAWINGS

The flow chart illustrates in detail an example of an embodiment of the invention.

DESCRIPTION OF THE PREFERRED EMBODIMENT

After the start 1 in which the function is activated, in activity 2 the charge is adjusted by an electronic control system according to the position of the accelerator pedal.

With activity 3, the torque of the internal combustion engine after the initial combustion by the intervention of the ignition is reduced, e.g., by retarding the ignition time. This is accomplished especially in the case of elevated charge.

As a result, activity 4 queries whether partial charge, e.g., in the case of an already-loaded internal combustion engine, has been set already. If this is the case, then the charge is corrected to a calculated nominal charge according to activity 5. If during activity 4 it is recognized that no partial charge has been set, then there is no need for a correction of the charge according to activity 5. As a result, during activity 6 a pulse equivalent is calculated on the basis of the torque from the initial combustion with allowance for a filtered form factor. The form factor in this case is taken from a memory in which it is stored during activity 16 after calculation during activity 14 and filtration during activity 15.

The pulse equivalent calculated in activity 6 is retriggered in activity 7 in the case of torque variations during subsequent combustions and a discard gradient is determined for the ignition retardation with allowance for the stored form factor. In activity 8 it is queried whether the minimal gradient queried in activity 7 has been reached for triggering the function within N combustions. If not, through activity 10 the ignition angle intervention is discarded and the internal combustion engine continues in normal operation.

If it is recognized in activity 9 that the discard gradient has been reached, then the ignition angle intervention is also discarded—activity 12. At the same time, however, the swept crank angle is registered up to the maximal pos. rpm gradient—activity 13. With involvement of the swept crank angle in activity 14, a form factor is calculated for the aging of the system which is obtained from a recursive filtration of the values of the previous load impact process. This form factor is filtered in activity 15 and stored in activity 16 in order to be ready for the calculation of the pulse-equivalents during activity 6.

As a result, the internal combustion engine continues in normal operation—activity 11.

What is claimed is:

1. A method for damping load impacts in a drive train of a motor vehicle driven by an internal combustion engine equipped with an electronic control system, characterized by the following steps:
   adjusting a fuel charge with the electronic control system in response to a position of an accelerator pedal;
   calculating on a basis of torque a pulse equivalent of the load impacts in the drive train of the motor vehicle over a period of time using a form factor calculated for the aging of the motor vehicle; and varying torque of the internal combustion engine through spark retard to cancel out the load impacts in the drive train of the motor vehicle.

2. The method of claim 1 wherein the basis of the torque equivalent of the load impacts is calculated from load impacts of a transmission function.

3. The method of claim 2 wherein the step of varying torque of the internal combustion engine through spark retard to cancel out load impacts in the drive train of the motor vehicle comprises retarding spark to generate an inverse function of the transmission function.

4. An engine control system comprising:

an internal combustion engine;

a controlling the internal combustion engine;

an accelerator pedal electronically coupled to said controller to provide a torque command;

a transmission coupled to said internal combustion engine; and wherein said controller determines load impacts of said transmission as a function of a pulse equivalent of torque over a period of time using a value calculated for the aging of the motor vehicle and controls spark retard of said internal combustion engine to cancel out said load impacts in said transmission.

5. The engine control system of claim 1 wherein said controller controls fuel charge to said internal combustion engine and controls spark retard in said internal combustion engine to cancel out disturbances generated by said fuel charge to said internal combustion engine.

6. The method of claim 1 wherein a recursive filter is used to process the values of load impacts over time.

7. A method of damping disturbances in an internal combustion engine comprising the steps of:

adjusting fuel charge to the internal combustion engine according to the position of an accelerator pedal;

retarding the spark in response to the charge adjustment;

determining whether a partial charge has been set;

calculating a pulse equivalent of torque for the partial charge using a filtered form factor over a period of time to account for age of the vehicle;

determining a discard gradient for retarding the spark using the pulse equivalent of torque for the partial charge; and discontinuing retard of the spark if the discard gradient has been reached.

8. A method for damping load impacts in a drive train of a motor vehicle driven by an internal combustion engine equipped with an electronic control system, comprising:

adjusting a fuel charge with the electronic control system in response to a position of an accelerator pedal;

calculating on a basis of torque a pulse equivalent of the load impacts in the drive train of the motor vehicle;

varying torque of the internal combustion engine through spark retard to cancel out the load impacts in the drive train of the motor vehicle; and calculating the load impacts continuously over the life of the motor vehicle using a filtered age factor.

9. The method of claim 8, wherein the basis of the torque equivalent of the load impacts is calculated from load impacts of a transmission.

* * * * *